United States Patent [19]

Quzilleau

[11] Patent Number: 5,574,830
[45] Date of Patent: Nov. 12, 1996

[54] COMPUTER AIDED TACTILE DESIGN

[75] Inventor: Gaston Quzilleau, Quebec, Canada

[73] Assignee: Foundation Centre Louis-Hebert, Canada

[21] Appl. No.: 234,085

[22] Filed: Apr. 26, 1994

[51] Int. Cl.[6] .................................................. G06K 15/00
[52] U.S. Cl. ........................ 395/103; 434/113; 434/112; 434/114
[58] Field of Search .................... 395/103, 101, 395/153; 434/113, 114, 112, 115, 117; 340/825.19, 407.1, 407.2; 101/22, 23, 28

[56] References Cited

U.S. PATENT DOCUMENTS

| | | | |
|---|---|---|---|
| 3,598,042 | 8/1971 | Boyd | 101/63 |
| 4,108,066 | 8/1978 | Andersson | 101/22 |
| 4,266,936 | 5/1981 | Rose et al. | 434/114 |
| 4,283,178 | 8/1981 | Tetzlaff | 434/114 |
| 4,667,182 | 5/1987 | Murphy | 340/407.1 |
| 4,752,772 | 6/1988 | Litt et al. | 340/407.1 |
| 4,772,205 | 9/1988 | Chlumsky et al. | 434/114 |
| 4,871,992 | 10/1989 | Peterson | 340/407.1 |
| 4,879,698 | 11/1989 | Langberg | 340/407.1 |
| 4,898,536 | 2/1990 | Hottarth | 434/114 |
| 5,091,865 | 2/1992 | Yamada et al. | 395/153 |
| 5,186,629 | 2/1993 | Rohen | 434/114 |
| 5,222,895 | 6/1993 | Fricke | 434/113 |

*Primary Examiner*—Mark R. Powell
*Assistant Examiner*—Tracy M. Legree
*Attorney, Agent, or Firm*—Wheeler Kromholz & Manion

[57] ABSTRACT

Disclosed herein is a tactile image drawing system for the visually impaired comprising: a) a computer for storing and processing graphic images and alphanumeric and braille text; b) a reference surface on which the graphic images or text will be drawn; c) a plotter connected to and cooperative with the computer for receiving data representative of the graphic images or alphanumeric text and for drawing the graphic images or alphanumeric and braille text, the plotter having an extrusion syringe for dispensing a bead of liquid material for drawing the graphic images or text on the reference surface; d) device connected to and cooperative with the computer and the plotter for governing the flow output and the temperature of the liquid material; wherein the liquid material is viscous and fast-drying and is adapted to dry as a raised relief when deposited on the reference surface, the raised shape creating a tactile representation recognizable by tactile perception performed by a visually impaired person.

10 Claims, 6 Drawing Sheets

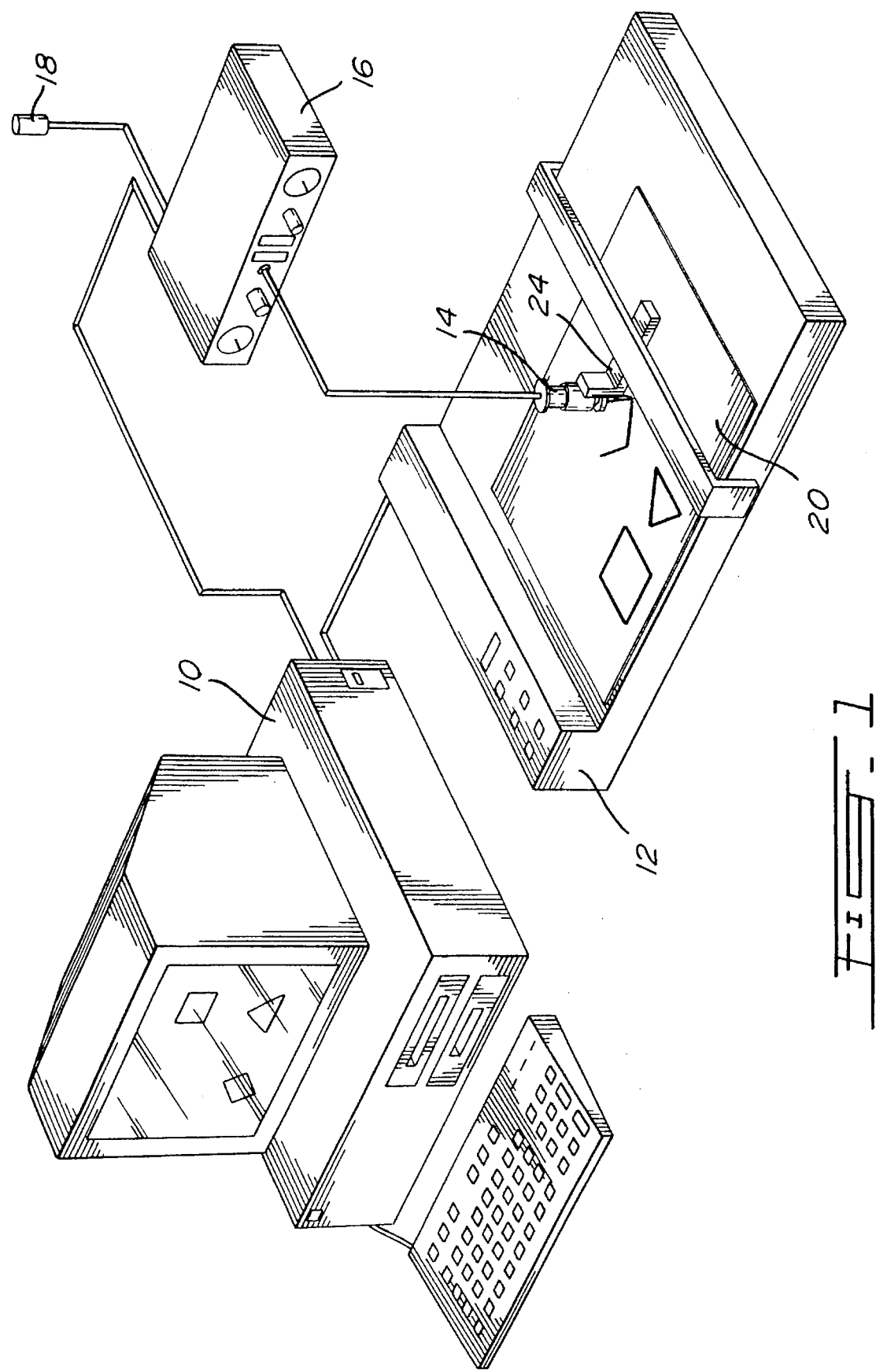

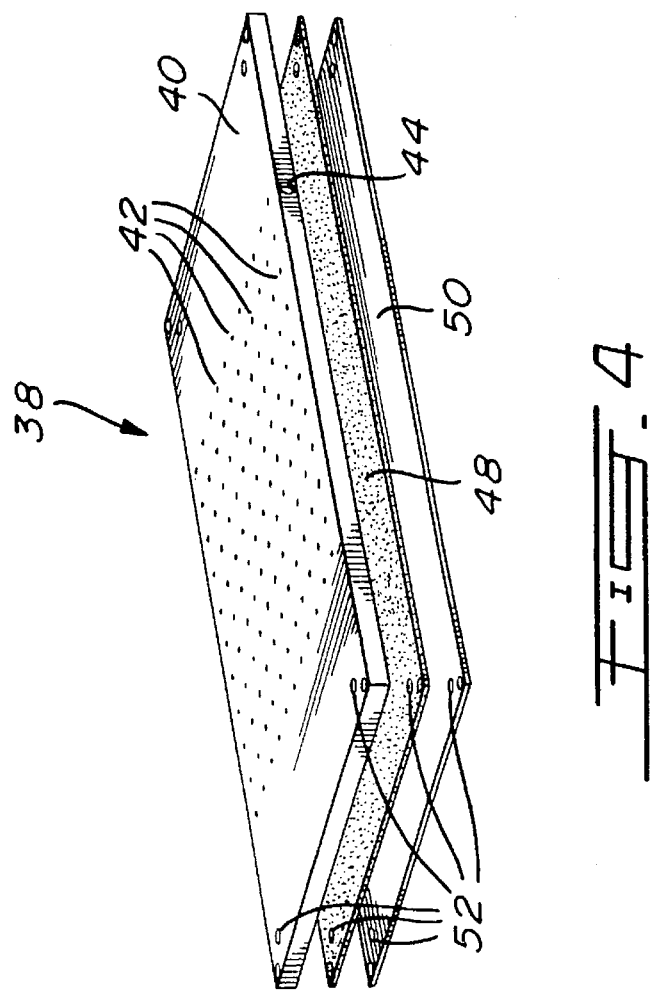
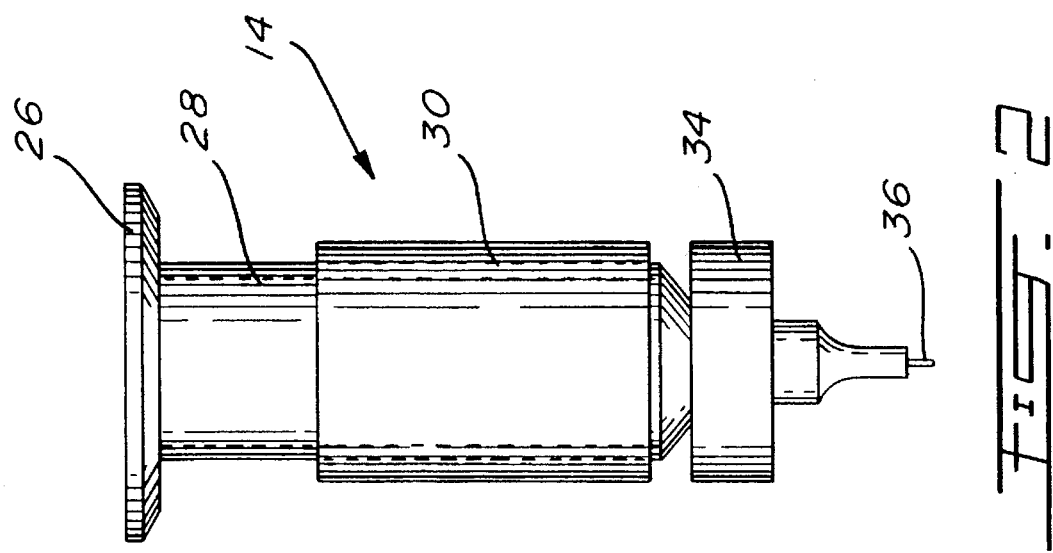

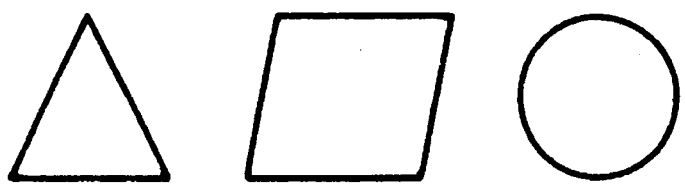
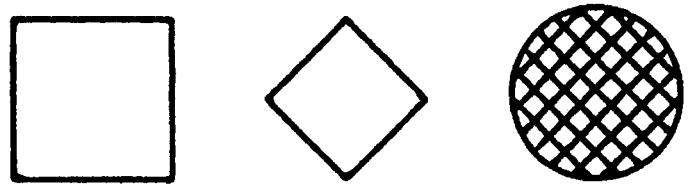
FIG. 3
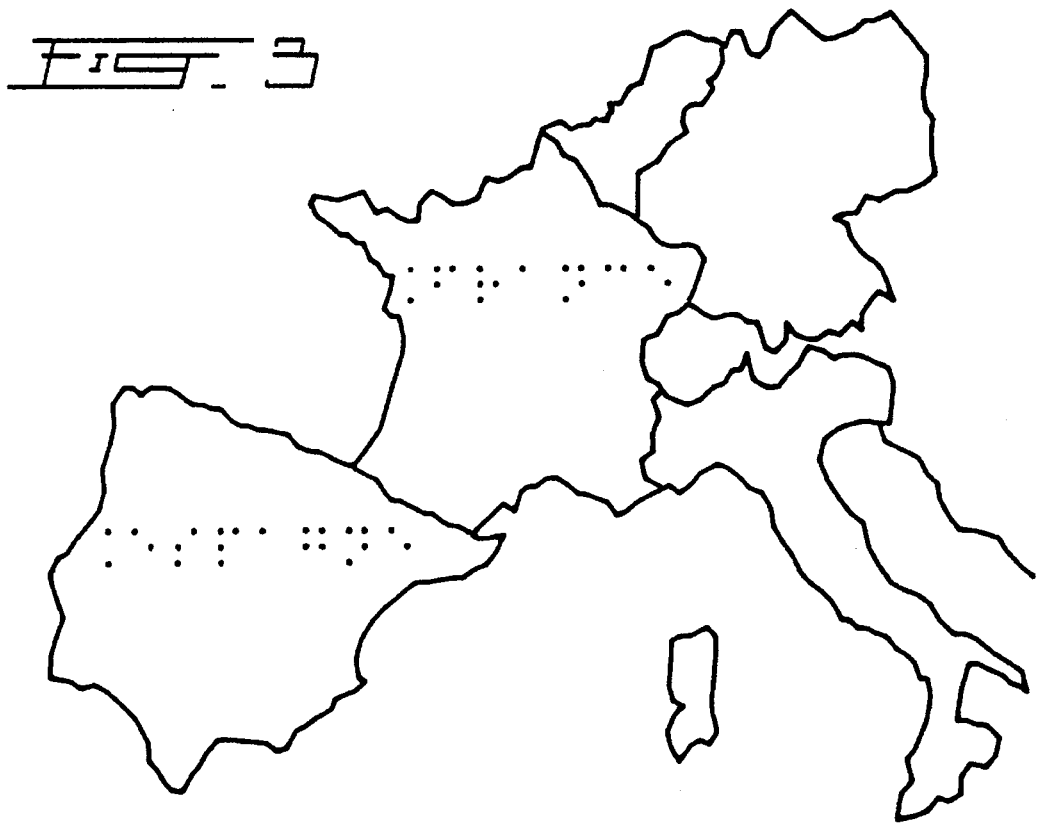
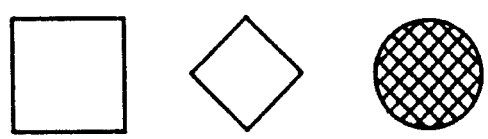

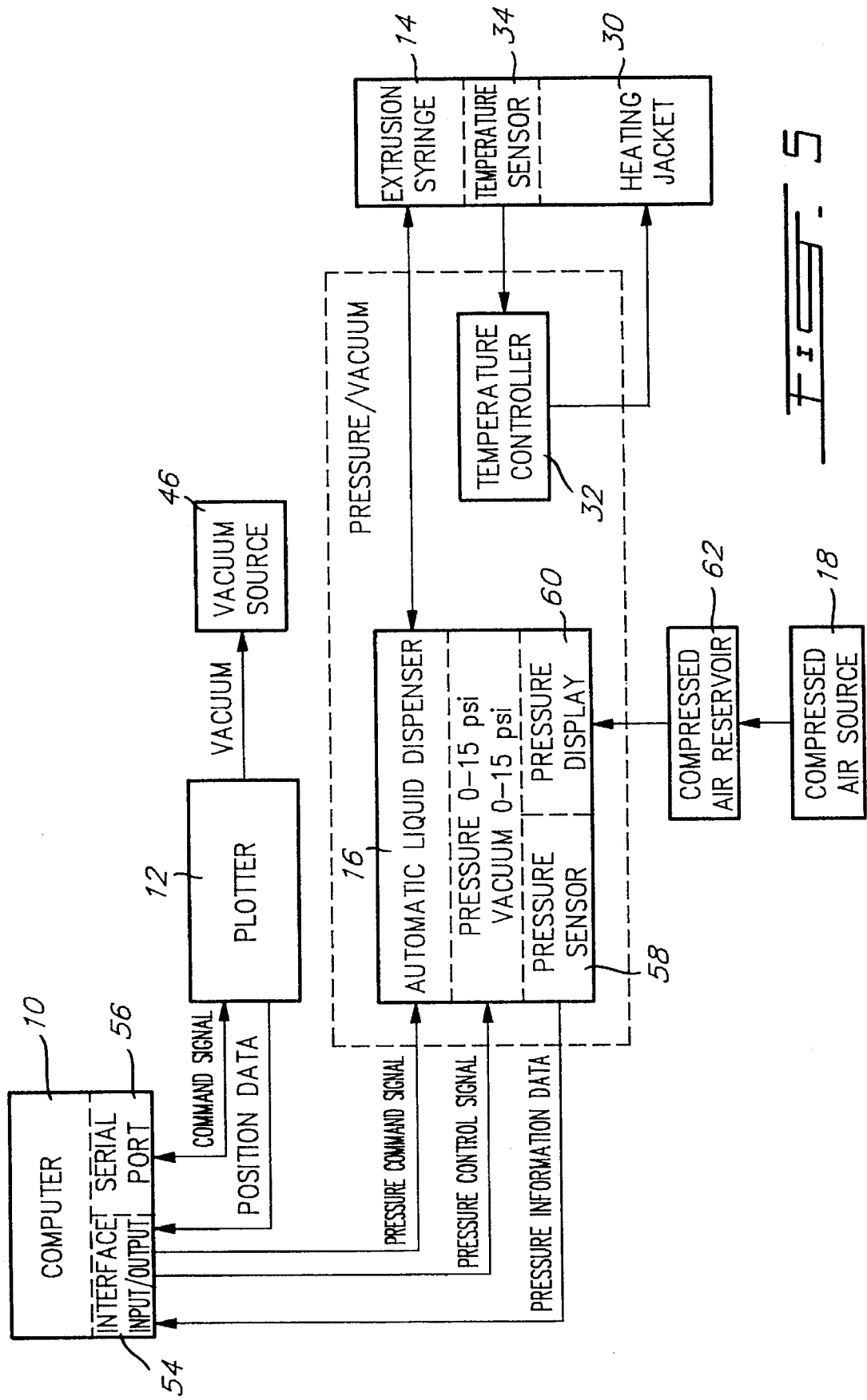

| FIG.6A |
| FIG.6B |

5,574,830

COMPUTER AIDED TACTILE DESIGN

BACKGROUND OF THE INVENTION

1. Field of the Invention

This invention generally relates to an apparatus for providing tactile graphic images or alphanumeric text for the visually impaired. More specifically, the invention relates to a system for producing tactile drawings and braille text from data generated by conventional computer graphics software.

2. Description of the Prior Art

A number of methods have been developed to allow blind persons or persons with serious visual impairments to lead normal and independent lives. Continuous effort has been deployed in ensuring that blind people can have access to literary works. For example, the development of Braille language by Louis Braille was a major breakthrough to allow the blind person to "read" by tactile recognition of series of pattern points corresponding to standard alphabets. More recently, further efforts have yielded various computerized Braille language display systems. There are also known computerized systems which scan pages of conventional text and through the use of a speech synthesizer read out the words for a blind user.

However, the systems described above do not allow a blind person to have access to certain graphic images or figures. But, for example, a blind person will not be able to read a conventional road map or to discern printed images. Some rudimentary means have been employed to prepare tactile images which may be recognize by tactile perception with fingers. The most rudimentary example is the gluing of string on paper whereby tactile shapes may be created. Other methods include creating embossed master from which tactile shapes in thermoplastic material can be made. Such methods commonly involve the embossing of graphics and/or shapes in a light gage aluminum foil and the subsequent step of heating a thermoplastic sheet and vacuum forming it over the master.

It is also noted that some tactile Braille display systems using raised and retractable array of pins can be used to display tactile images. For example, such systems are described in U.S. Pat. No. 4,772,205 and U.S. Pat. No. 4,871,992. However, graphic displays created by such systems are ephemeral and are not portable. The user must have access to the complicated and generally very expensive graphic display equipment. Moreover, the resolution and size of graphic display provided by such systems is limited.

Consequently, there remains an important need for a system which will efficiently and inexpensively prepare tactile graphic images on any suitable reference surface such as a sheet of paper.

SUMMARY OF THE INVENTION

The invention provides a tactile image drawing system for the visually impaired comprising: a) a computer for storing and processing graphic images or alphanumeric text; b) a reference surface on which the graphic images or alphanumeric text will be drawn; c) a plotter connected to and cooperative with the computer for receiving data representative of the graphic images or alphanumeric text and for drawing the graphic images or braille text, directly on any reference surface such as paper, the plotter having an extrusion syringe for dispensing a bead of extruded material for drawing the graphic images or braille text on the reference surface; d) means connected to and cooperative with the computer and the plotter for regulating the flow output and the temperature of the extruded material; wherein the extruded material is a viscous and fast-drying liquid material and is adapted to dry as a raised shape when deposited on the reference surface, the raised shape creating a tactile representation recognizable by tactile by a visually impaired person.

The present invention can therefore efficiently transfer graphic images into tactile drawings of chosen sizes. In accordance with a preferred embodiment, the present invention includes a vacuum or electrostatic table for maintaining a sheet of paper in place while a plotter draws raised beads of fast-drying liquid material. The width and height of the beads can be varied at will to create recognizable graphic imager, braille symbols, text, etc . . . by the person using tactile recognition on the drawn figures.

Other features and advantages of the invention will become apparent to those of ordinary skill in the art upon review of the following detailed description, claims, and drawings.

BRIEF DESCRIPTION OF THE DRAWINGS

To facilitate the full understanding of the invention, preferred embodiments thereof will now be described with reference to the accompanying drawings. In the drawings:

FIG. 1 shows a schematic perspective view of the essential components of the system of the present invention.

FIG. 2 is a schematic elevational view of the drawing syringe used to create raised images by laying a raised bead of fast-drying liquid on a reference surface.

FIG. 3 is a representative sample of the raised images created with a preferred embodiment of the system of the present invention.

FIG. 4 is a perspective exploded view of a preferred embodiment of a vacuum table used to maintain in place a reference surface in accordance with the present.

FIG. 5 is a block drawing of the components constituting a preferred embodiment of the present invention.

DESCRIPTION OF THE PREFERRED EMBODIMENTS

Figure 6:
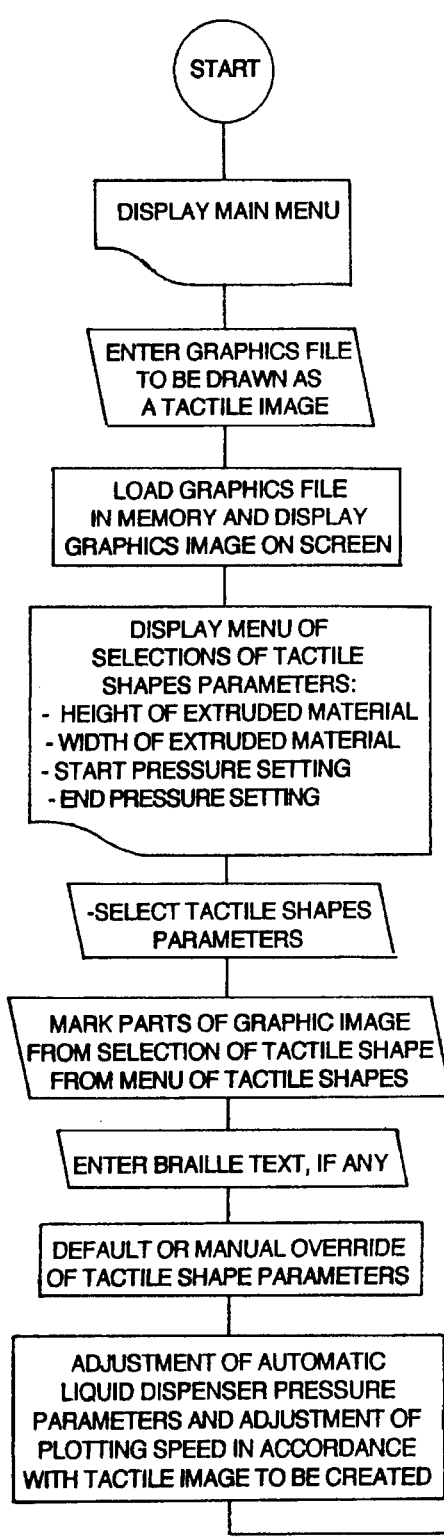
FIG. 6, comprising

The following detailed description, while indicating preferred embodiments of the invention, is given by way of illustration only, since various changes and modifications within the spirit and scope of the invention will become apparent to those skilled in the art.

Referring to the drawings, FIG. 1 schematically illustrates the major components of the overall system of the present invention used to create tactile graphic or text images on a flat reference surface. The major components of the overall system are a suitable computer 10 and various peripherals comprising: a plotter 12 equipped with a heated extrusion syringe assembly 14, a temperature controller (not shown), and an automatic liquid dispenser 16. The automatic liquid dispenser is connected to a compressed air source 18. Each of these major components will be described in greater detail and in relation to a preferred embodiment. In operation, the computer will run conventional graphics or text software which will direct the computer peripherals to create tactile images or text on a reference surface 20 previously disposed below and within the range of movement of extrusion syringe assembly 14.

Still referring to FIG. 1, the computer 10, can be a personal computer equipped with a standard processor such as an i486DX (trademark) type processor and standard interface ports (not shown), namely at least one input/output interface and at least one serial port. The computer 10 is connected to a plotter 12 by schematic line 18. In a preferred embodiment, the plotter 12 is a an ME-500 (trade name) engraving plotter manufactured by Mimaki Engineering Co. Ltd. of Tokyo, Japan. The plotter 12 is HP-GL (trademark) code compatible and can be controlled by suitable graphics or presentation software for personal computers. The drawing arm 24 of such plotter 12 is mobile in the x-y-z planes under the command of computer 10. The command and data signals relationships between the computer 10 and its peripherals will be described in greater detail later when reference will be made to FIG. 5. A mechanical adaptor supports the extrusion syringe assembly 14 which is connected to automatic liquid dispenser 16. In a preferred embodiment, drawing arm 24 is modified to strengthen drawing arm 24 so that it may securely hold extrusion syringe assembly 14 while allowing other plotting, scribing, or engraving means to be quickly substituted in place of syringe assembly 14. Such modifications would be quickly apparent to those skilled in the operation of similar equipments.

Optionally, the system of the present invention will also comprise a scanner to scan graphic images into computer 10 for subsequent transcription as tactile drawings using the system described herein.

In operation, the computer 10, will command the plotter 12 holding extrusion syringe assembly 14 to trace with extruded material any required image onto reference surface 20. The computer will also command the automatic liquid dispenser 16 which will in turn command the extrusion flow rate of liquid from syringe assembly 14 onto reference surface 20. It is to be understood that numerous parameters, such as the following, will regulate the tactile character of the resulting image:

the viscosity and drying or gelling speed of the extruded liquid (the extruded material);

the plotting velocity of syringe assembly 14;

the flow rate of extrusion of liquid from syringe assembly 14;

the distance of syringe assembly 14 relative to reference surface 20;

the extrusion diameter of the syringe tip of syringe assembly 14.

It is further to be understood that the above parameters may conveniently be managed with appropriate computer software which would be easily adapted from conventional software or produced by those skilled in the art. In a preferred embodiment, the system of the present invention is operated by a computer aided design system such as the Super Boss (trademark) release 6.3 graphics software sold by SignMax Inc. Still, in a preferred embodiment, the Super Boss (trademark) driver was configured to efficiently operate the components of the system of the present invention. These and other similar modifications would be easily understood and effected by those knowledgeable in personal computer operation and design.

It was discovered by the inventors that the preferred substance for creating tactile graphics or text consists of meltable ink crayons (not shown) such as Thermo Jet (trademark) Ink, distributed by Howtek Inc. of Hudson, N.H., under part number H01223. Such ink exhibits advantageous properties such as a quick drying time, good adherence to most surfaces such as cardboard and some flexibility when dry.

Extrusion syringe 14 will now be described in greater detail with reference to FIGS. 1 and 2. Syringe 14 is connected to the automatic liquid dispenser 16 by coupling 26. Syringe 14 comprises a hollow barrel 28 adapted to receive the material to extruded such as Thermo Jet (trademark) meltable ink crayons (not shown). A cylindrical heating jacket 30 is disposed in contiguous relationship and around barrel 28 and is capable of melting the meltable ink crayons into a liquid which may then be extruded by air pressure from automatic liquid dispenser 16. Heating jacket 30 is connected to a temperature controller 32 (shown on FIG. 5) which may be placed under the command of computer 10 or may optionally be manually set at a chosen temperature. In a preferred embodiment the temperature controller is an Omega (trademark) model M1508/1292 temperature controller. Also in a preferred embodiment, heating jacket 30 consists of a heating coil. A temperature sensor 34 (thermocouple) is disposed below heating jacket 30 to monitor the temperature of the molten ink (the extruded material). Syringe assembly 14 tapers downwardly to form an extruded material dispensing tip 36 for depositing the extruded material onto reference surface 20.

FIG. 3 constitutes a sample exemplifying the types of images which may be conveniently and quickly obtained with the system of the present invention. In FIG. 3, it can be seen that the width and height of the tactile representations may be varied at will so that various relief effects recognizable by tactile perception.

Turning back to FIG. 1, the automatic liquid dispenser 16 will now be described in further detail. A preferred embodiment uses a model 1000XL (trade name) automatic liquid dispenser, manufactured by EFD, Inc. The dispenser 16 provides consistent flow rate control for dispensing the extruded material. The dispenser 16 also provides consistent pulse deposits for dispensing dots of extruded material such as for braille text. The dispenser 16 is connected to standard electrical power supply and to a compressed air source 18. The dispenser 16 is adapted to use the compressed air source 18 to push the extruded material out of syringe assembly 14 and to be capable almost instantaneously stop the flow of extruded material by applying a vacuum to syringe assembly 14 to effectively suck in any droplet of extruded material hanging from dispensing tip 36 on syringe assembly 14. This rapid pulse action is controlled by computer 10 with the use of appropriate software. This arrangement permits the creation of high precision tactile images with various reliefs on reference surface 20.

FIG. 4 schematically illustrates an optional vacuum plate assembly 38 for mounting on the plotting surface of plotter 12 and used for maintaining in place a reference surface 20 such as a sheet of cardboard during operation of the system of the present invention. The vacuum plate assembly comprises a top plate 40 having numerous perforations 42 disposed orthogonally to the top flat surface of top plate 40. Each perforation 42 is connected to channels (not shown) which are all connected to a vacuum port 44 which is connection to a vacuum source 46 (shown on FIG. 5). In operation, when a reference surface 20 such as a sheet of paper or cardboard is placed on top plate 40, the vacuum created underneath the reference 20 will firmly maintain it in place. The vacuum plate assembly is completed with a rubber seal layer 48 and a bottom plate 50. The components of the vacuum plate assembly are secured together with suitable fasteners such as nuts and bolts (not shown) positioned in holes 52. Advantageously, the top and bottom plates 40 and 50 will be formed of metal such as aluminium or steel.

Turning now to FIG. 5, there is shown a schematic block diagram of relationships including command and data connections between computer 10 and its peripherals in accordance with a preferred embodiment of this invention. Computer 10 is provided with at least one input/output interface 54 and at least one serial port 56. Plotter 12 is connected to computer 10 by serial port 56 having a wire carrying a command signal generated by computer 10. Plotter 12 is also linked to computer 10 by a input/output interface 54 for providing data on the x-y-z coordinates of the extrusion syringe assembly 14. Plotter 12 is also connected to a vacuum source for operating vacuum plate assembly 38.

The input/output interface 54 also connects the computer 10 to the automatic liquid dispenser 16. A pressure control and pressure command signals from computer 10 regulate the pressure or vacuum output of the automatic liquid dispenser 16 to extrusion syringe assembly 14. A pressure sensor 58 in the automatic liquid dispenser relays pressure information data to computer 10. The automatic liquid dispenser is also equipped with an input pressure display 60 for displaying pressure information data on compressed air incoming from compressed air reservoir 62 charged by compressed air source 18.

Extrusion syringe assembly 14 is provided with a heating jacket 30 for melting the material to be extruded. The molten material temperature is measured by temperature sensor 34 which is connected to a temperature controller 32. The temperature controller 32 can be set to maintain a chosen temperature. In an alternate embodiment, the temperature controller 32 can be linked to the computer 10 so that temperature regulating functions are dictated by the computer 10.

Figure 6A:
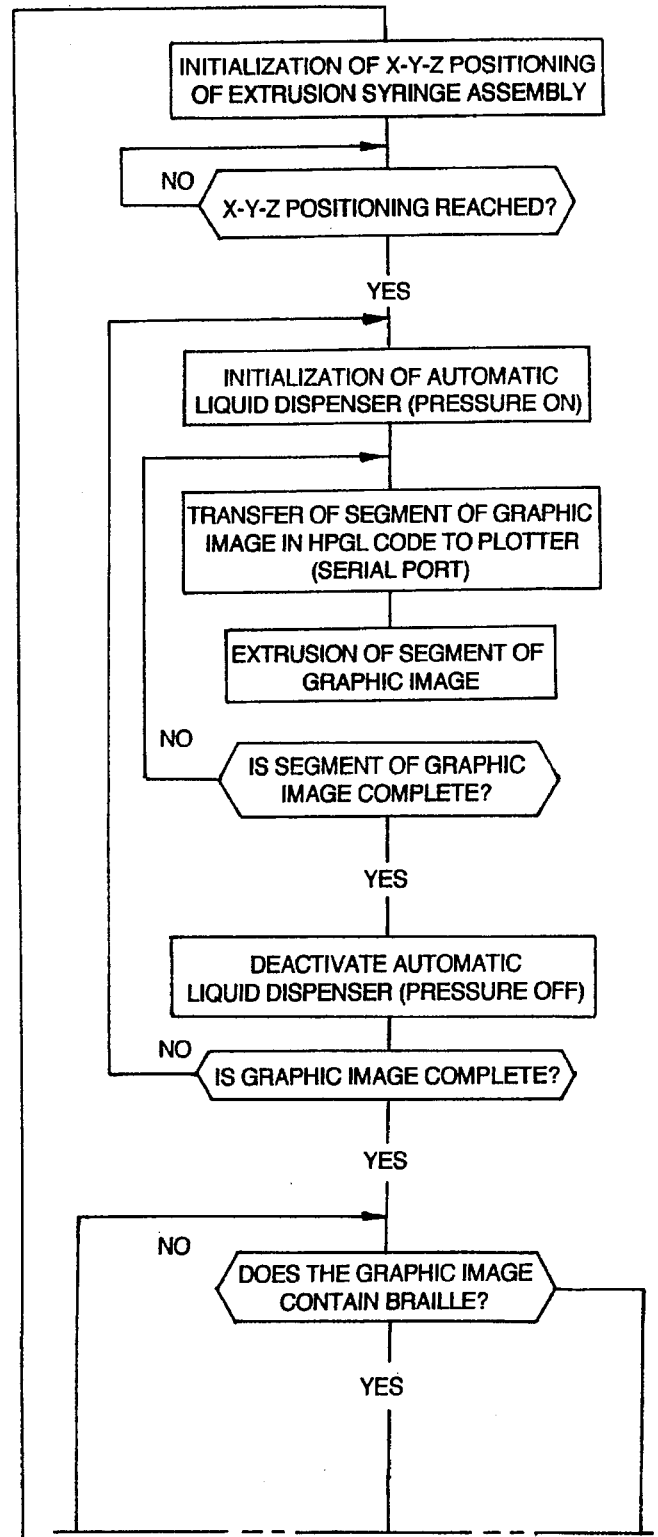
FIGS. 6A and 6B, is a flow chart illustrating a typical procedure by which the computer carries out the preferred embodiment of the present invention.
Figure 6B:
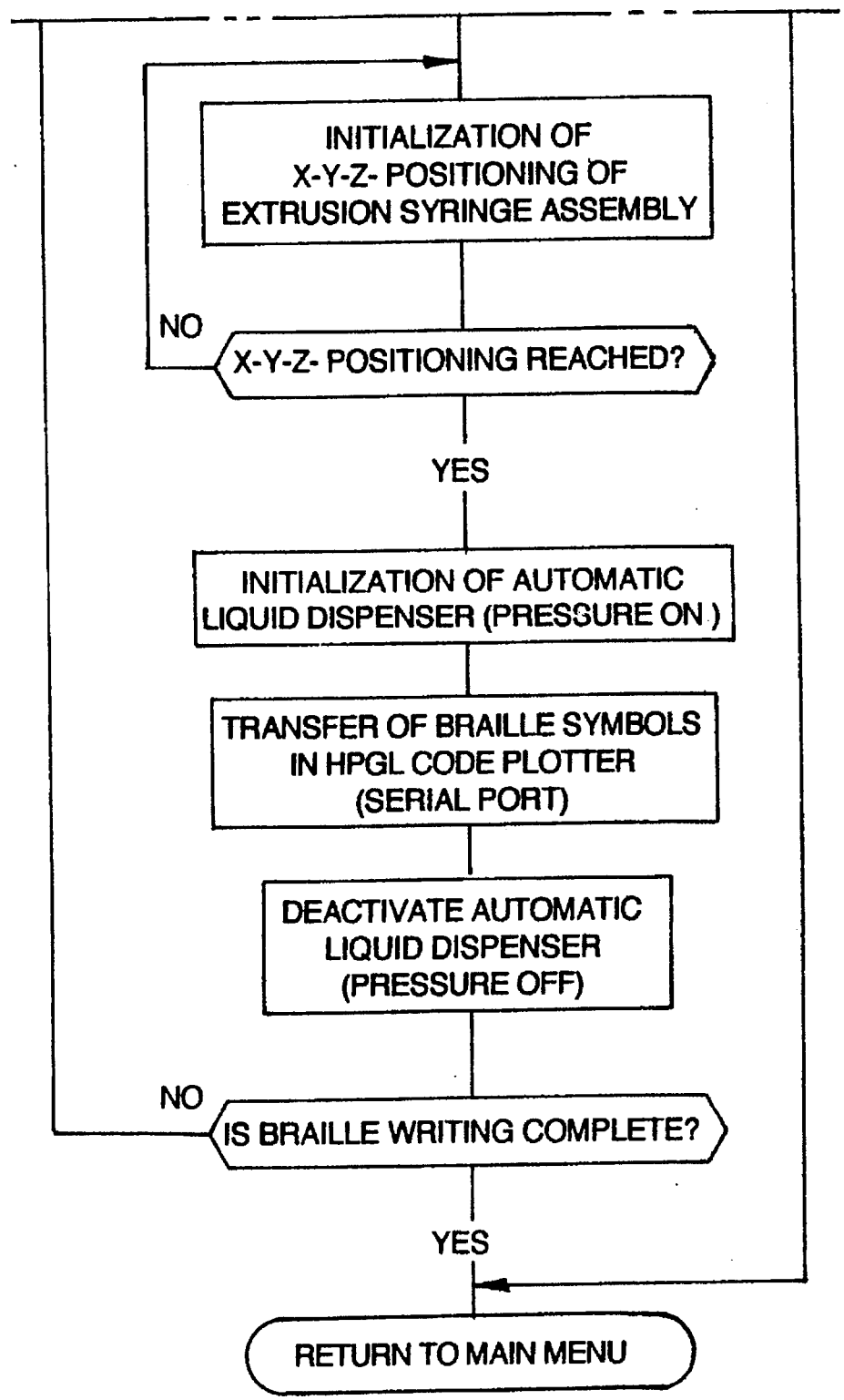

To provide a full example of the preferred embodiment of the present invention, the flow chart shown in FIGS. 6A and 6B illustrates a typical procedure by which the computer 10 carries out the above described functions.

A unique system for the creation of tactile images has been described. It should be appreciated by those skilled in the art that many modifications or additions may be made to the preferred embodiments disclosed herein. Accordingly, the scope of the present invention is only limited in accordance with the following claims.

What is claimed is:

1. A tactile image drawing system for the visually impaired comprising:

a) a computer for storing and processing graphic images or alphanumeric text;

b) a reference surface on which said graphic images or alphanumeric text will be drawn;

c) a plotter connected to and cooperative with said computer for receiving data representative of said graphic images or alphanumeric text and for drawing said graphic images or alphanumeric text and, said plotter having an extrusion syringe for dispensing a bead of extruded material for drawing said graphic images or alphanumeric text on said reference surface;

d) means connected to and cooperative with said computer and said plotter for governing the flow volume of said extruded material;

wherein said extruded material is a viscous and fast-drying liquid, and is adapted to dry as a raised shape when deposited on said reference surface, said raised shape creating a tactile representation recognizable by tactile perception performed by a visually impaired person.

2. The system of claim 1 wherein said extrusion syringe comprises a barrel for receiving material to be extruded and heating means in conductive contact with said barrel for heating said material.

3. The system of claim 2 wherein said extrusion syringe further comprises a temperature sensor and wherein said system further comprises a temperature controller for controlling the temperature of the material to be extruded.

4. The system of claim 3 wherein said temperature controller is connected to said computer.

5. The system of claim 1, 2, 3 or 4 further comprising fixation means for maintaining in a fixed position on said plotter said reference surface during operation of the said system.

6. The system of claim 5 wherein said fixation means consists of a vacuum plate.

7. The system of claim 6 wherein said vacuum plate comprises a top plate, a middle seal layer, and a bottom plate, wherein said top plate comprises a plurality of small holes connected to a vacuum source, and said top plates, middle seal layer and bottom plate a held in compressed contiguous relationship whereby said vacuum source generates a local vacuum effect proximate to said holes in said top plate thereby firmly maintaining in place said reference surface deposited thereon.

8. The system of claim 1 wherein said reference surface is selected from the group of materials consisting of paper, plastic, cardboard, and fabric.

9. The system of claim 1 wherein the positioning of said extrusion syringe may be regulated in each of the x,y and z planes.

10. The system of claim 1 wherein the means connected to and cooperative with said computer and said plotter for governing the flow output of said extruded material consists of an automatic liquid dispenser.

\* \* \* \* \*